US012609340B2

(12) United States Patent
Lee et al.

(10) Patent No.: US 12,609,340 B2
(45) Date of Patent: Apr. 21, 2026

(54) ELECTROLYTE MEMBRANE WITH HIGH PERFORMANCE AND DURABILITY FOR FUEL CELL AND MANUFACTURING METHOD THEREOF

(71) Applicants: Hyundai Motor Company, Seoul (KR); Kia Corporation, Seoul (KR)

(72) Inventors: Woo Jin Lee, Seoul (KR); Ju Young Lee, Gyeonggi-do (KR); Kyu Tae Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 696 days.

(21) Appl. No.: 18/078,952

(22) Filed: Dec. 10, 2022

(65) Prior Publication Data

US 2023/0282860 A1     Sep. 7, 2023

(30) Foreign Application Priority Data

Mar. 7, 2022     (KR) ........................ 10-2022-0028493

(51) Int. Cl.
　H01M 8/1018　　(2016.01)
　H01M 8/1004　　(2016.01)
　*H01M 8/10*　　　(2016.01)

(52) U.S. Cl.
CPC ....... H01M 8/1018 (2013.01); H01M 8/1004 (2013.01); *H01M 2008/1095* (2013.01); *H01M 2300/0082* (2013.01)

(58) Field of Classification Search
CPC ............ H01M 8/1018; H01M 8/1004; H01M 2008/1095; H01M 2300/0082
USPC ........................................................ 429/483
See application file for complete search history.

(56) References Cited

U.S. PATENT DOCUMENTS

| | | | | |
|---|---|---|---|---|
| 2014/0065519 A1* | 3/2014 | Vincent | .............. | H01M 8/0247 |
| | | | | 429/535 |
| 2018/0366745 A1* | 12/2018 | Kim | .................... | H01M 4/8817 |
| 2019/0252705 A1* | 8/2019 | Mathias | .............. | H01M 8/1004 |
| 2020/0212457 A1* | 7/2020 | Ko | ........................ | H01M 8/1004 |
| 2020/0266473 A1* | 8/2020 | Park | .................... | H01M 8/106 |
| 2022/0093952 A1* | 3/2022 | Speidel | .................... | C25B 9/63 |

* cited by examiner

*Primary Examiner* — James M Erwin
(74) *Attorney, Agent, or Firm* — Fox Rothschild LLP

(57) ABSTRACT

Proposed is an electrolyte membrane for a fuel cell having high performance and high durability and a method for manufacturing thereof. The electrolyte membrane comprises a sheet part having a plate shape with a predetermined length and width, wherein the sheet part including a non-reaction area in a peripheral portion and a reaction area in a center portion; and a reinforcing part positioned on at least one of both ends along the longitudinal direction of the reaction area and having a predetermined thickness.

20 Claims, 3 Drawing Sheets width
direction longitudinal
direction

100

120        110(112)        110(111)        120

110

112                                111

ELECTROLYTE MEMBRANE WITH HIGH PERFORMANCE AND DURABILITY FOR FUEL CELL AND MANUFACTURING METHOD THEREOF

CROSS REFERENCE TO RELATED APPLICATION

The present application claims priority to Korean Patent Application No. 10-2022-0028493, filed Mar. 7, 2022, the entire contents of which is incorporated herein for all purposes by this reference.

TECHNICAL FIELD

The present invention relates to an electrolyte membrane for a fuel cell having high performance and high durability and a method for manufacturing method thereof.

BACKGROUND

A membrane-electrode assembly (MEA) for a fuel cell plays a role in generating electric energy in a vehicle equipped with a fuel cell. In the membrane-electrode assembly, a cathode and an anode are disposed on both sides of the electrolyte membrane. When air (oxygen) is supplied to the cathode, and hydrogen is supplied to the anode, the membrane-electrode assembly generates a voltage of about 1 V.

A cell is formed by sequentially stacking a gas diffusion layer, which forms a flow path for electrical transfer and mass transfer on the cathode and the anode, respectively, a separator and the like. Hundreds of cells are connected in series to generate the energy required to drive a vehicle.

The voltage generated in the membrane-electrode assembly depends on the required output. As the required current increases, electrical resistance and mass transfer resistance occur, and accordingly, an IV curve (current-voltage curve) with an inversely proportional tendency is shown when a graph of current/voltage is drawn.

The initial voltage drop in the IV curve indicates activation loss and depends on the properties of the catalyst. The intermediate straight-line part occurs as a voltage loss multiplied by various electrical resistance in the electrode, the gas diffusion layer, the separator, etc., hydrogen ion conduction resistance at the interface, and current. Finally, the output decrease in the high current region is a mass transfer loss, which occurs due to the limitations of oxygen supply, hydrogen ion transfer, and water droplet discharge.

The performance of the membrane-electrode assembly may be improved by solving the resistance factor as described above. For example, the material such as a catalyst having pore structure may be considered as the material of electrolyte membrane and cathode for providing high power response, while a thin film electrolyte membrane may be considered to increase the hydrogen ion conductivity in the electrolyte membrane material.

In general, the cathode reaction acts as a bottleneck in the performance of the membrane-electrode assembly, but hydrogen ion transport in the electrolyte membrane is also a problem in a high power region. In order to improve the hydrogen ion transport in the electrolyte membrane, it is necessary to improve the properties of various polymers and additives, in addition to improving the material, thinning the electrolyte membrane is also a direct solution.

However, while thinning the electrolyte membrane is advantageous in terms of performance, it is disadvantageous in durability. Physical and chemical degradation occur in the electrolyte membrane during operation, and it does not affect a certain level, but if the electrolyte membrane is degraded enough to penetrate hydrogen and air, the cell voltage cannot be maintained. That is, since thinning the electrolyte membrane causes a problem with durability, it is difficult to commercialize.

SUMMARY

In preferred aspects, provided are an electrolyte membrane for a fuel cell capable of maintaining durability while taking advantage of performance improvement through thin film and a method for manufacturing thereof.

The objective of the present disclosure is not limited to the object mentioned above. The objectives of the present disclosure will become more apparent from the following description and will be realized by means and combinations thereof described in the claims.

Provided is an electrolyte membrane for a fuel cell that may include a sheet part having a plate shape with a predetermined length and width; and a reinforcing part positioned on at least one of longitudinal ends of the reaction area and having a predetermined thickness. The sheet part may include a non-reaction area on the edge side and a reaction area on the center portion.

A term "sheet part" as used herein refers to a three-dimensional shape of a sheet, film or a thin layer, which has a planar surface and a substantially reduced thickness (e.g., millimeter, micrometer, or nanometer scale) compared to a width or a length of the planar surface.

The thickness of the sheet part may be about 5 $\mu$m to 50 $\mu$m.

The reinforcing part may be disposed on at least one surface of the sheet part.

A cross-section in the longitudinal direction of the reinforcing part may have a streamline curved shape such that a thickness of the cross section is reduced toward both ends from a center portion thereof.

The "streamline curved shape" as used herein refers to a structure or shape that is designed to reduce resistance to motion through a fluid (e.g., liquid or air). The streamline curved shape may include lines formed on a surface that may be parallel or along with the flow of a fluid (e.g., liquid or air).

One end of the reinforcing part in the longitudinal direction of the electrolyte membrane may be disposed on the reaction area, and the other end may be disposed on the non-reaction area.

The width of the reinforcing part may be equal to or greater than the width of the reactive area.

The ratio (D2/D1) of the thickness of the reinforcing part D2 to the thickness of the sheet part D1 may be about 0.1 to 1.

The thickness of the reinforcing part may be about 5 $\mu$m to 50 $\mu$m.

The distance from one end of the reaction area to one end of the reinforcing part disposed on the reaction area may be about 2 cm to 5 cm.

The sheet part may include an antioxidant in an amount of about 1 $\mu$g/cm$^2$ or less.

The reinforcing part may include an antioxidant in an amount of about 1 $\mu$g/cm$^2$ to 100 $\mu$g/cm$^2$ The sheet part may include a first ionomer, the reinforcing part may include a second ionomer, and the first ionomer and the second ionomer may be the same as or different from each other.

The term "ionomer" as used herein refers to a polymeric material or resin that includes ionized groups attached (e.g., covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

In an aspect, provided is a membrane-electrode assembly including the electrolyte membrane as described herein a pair of electrodes disposed on the reaction area of the electrolyte membrane; a sub-gasket disposed on the non-reaction area of the electrolyte membrane.

The electrode may cover a portion of the reinforcing part, and the sub-gasket may be positioned in a space defined by a side surface of the electrode and the remaining portion of the reinforcing part not covered by the electrode.

In an aspect, provided is a method of manufacturing the electrolyte membrane for the fuel cell including steps of preparing the sheet part described above, and forming the reinforcing part having a predetermined thickness of at least one of both end parts in a longitudinal direction of the reaction area.

The reinforcing part may be formed by spray coating an ionomer solution.

The method may include supplying the sheet part in a roll-to-roll method, marking a region in which the reinforcing part is to be formed on the sheet part, and then forming the reinforcing part in the region.

Also provided is a fuel cell including the electrolyte membrane as described herein.

Further provided is fuel cell including the electrolyte membrane manufactured by the method described herein.

In another aspect, provided is a vehicle including the fuel cell as described herein.

According to various exemplary embodiments of the present invention, the electrolyte membrane may maintain durability while taking advantage of performance improvement through thin film formation.

The effects of the present disclosure are not limited to the effects mentioned above. It should be understood that the effects of the present disclosure include all effects that can be inferred from the following description.

Other aspects of the invention are disclosed infra.

DETAILED DESCRIPTION

Figure 1:
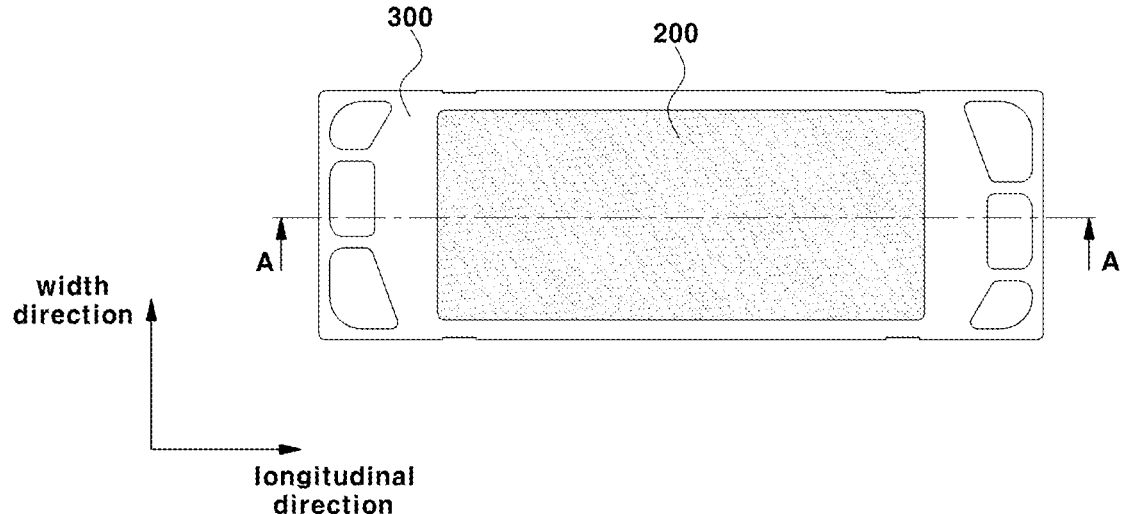
FIG. 1 shows an exemplary membrane-electrode assembly according to an exemplary embodiment of the present invention.

The above objectives, other objectives, features and advantages of the present disclosure will be easily understood through the following preferred embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In this specification, the terms "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where there is another part in between. Conversely, when a part of a layer, film, region, plate, etc., is said to be "under" another part, this includes not only cases where it is "directly under" another part but also a case where another part is between two parts.

Unless otherwise specified, all numbers, values, and/or expressions expressing quantities of ingredients, reaction conditions, polymer compositions, and formulations used herein contain all numbers, values and/or expressions in which such numbers essentially occur in obtaining such values, among others. Since they are approximations reflecting various uncertainties in the measurement, they should be understood as being modified by the term "about" in all cases. Further, unless specifically stated or obvious from context; as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
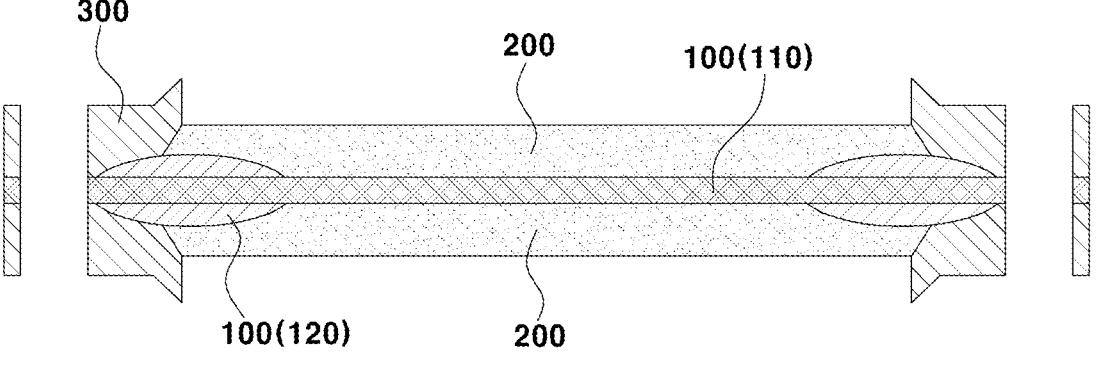
FIG. 2 shows a cross-sectional view taken along lines A-A' of FIG. 1.

FIG. 1 shows an exemplary membrane-electrode assembly according to an exemplary embodiment of the present invention. FIG. 2 shows a cross-sectional view taken along lines A-A' of FIG. 1. The membrane-electrode assembly may include: the electrolyte membrane 100; a pair of electrodes 200 disposed on the electrolyte membrane 100; and a sub-gasket 300 attached to the edge of the electrolyte membrane 100 so as not to overlap the electrode 200 along the edge of the electrode 200.

Figure 3:
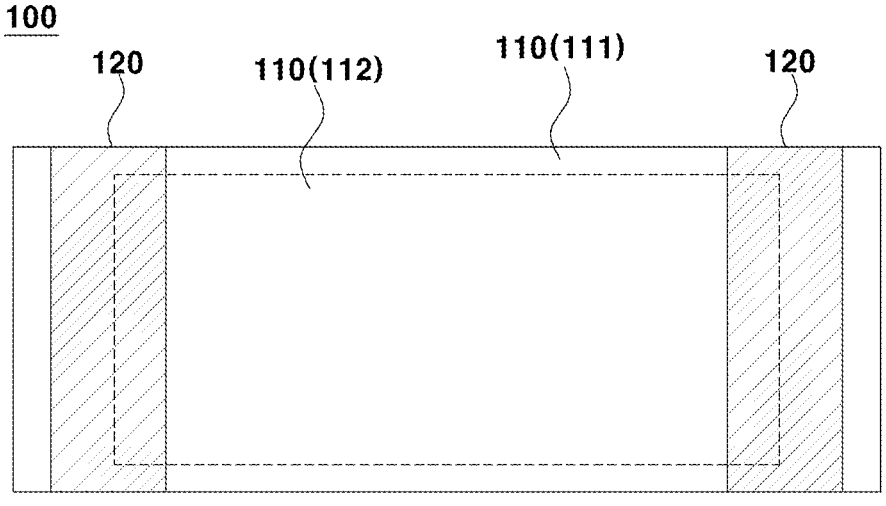
FIG. 3 shows a plan view of an exemplary electrolyte membrane according to an exemplary embodiment of the present invention.
Figure 4:
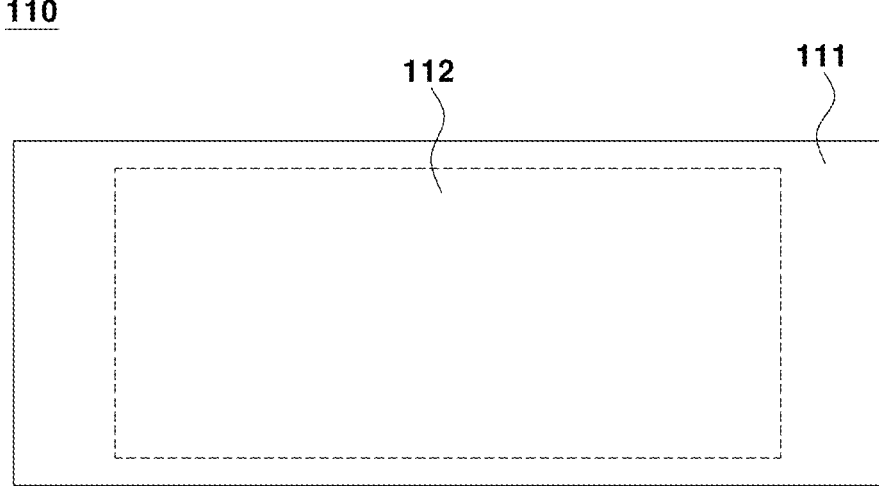
FIG. 4 shows a plan view of a sheet part included in an exemplary electrolyte membrane according to an exemplary embodiment of the present invention.

FIG. 3 shows a plan view of an exemplary electrolyte membrane according to an exemplary embodiment of the present invention. FIG. 4 shows a plan view of a sheet part 110 included in the electrolyte membrane 100. The sheet part 110 has a plate shape having a predetermined length and width and may include a non-reaction area 111 in a peripheral portion and a reaction area 112 in a center portion. The electrolyte membrane 100 may include a reinforcing part 120 disposed on at least one of both ends along the longitudinal direction of the reaction area 112 and having a predetermined thickness.

The sheet part 110 is characterized in that it is thinner than the conventional electrolyte membrane. Particularly, the thickness of the sheet part 110 may be about 5 µm to 50 µm. By making the sheet part 110 thinner than the conventional electrolyte membrane, the path of hydrogen ion transfer is reduced so that the performance of the fuel cell can be improved.

On the other hand, in order to solve the problem of durability caused by thinning the sheet part 110, the reinforcing part 120 may be formed at a specific position so that the specific position has the characteristics of a thick-filmed electrolyte membrane. When operating a fuel cell, the durability problem of the electrolyte membrane mainly occurs at the specific location, particularly, at the inlet/outlet side of fuel, oxygen, coolant, etc., compared to the center portion. The electrolyte membrane, which the above materials are positioned at the inlet/outlet side, is easily degraded by a moisture accumulation, an inflow of dry gas, a gas flow rate, a temperature of the coolant, and the like.

The reinforcing part 120 may be positioned on both sides of the sheet part 110 at both ends along the longitudinal direction of the reaction area 112. However, the position of the reinforcing part 120 is not limited thereto, and it can be changed to an appropriate place according to the position of the aforementioned inlet/outlet side. The reinforcing part 120 may dispose on at least one surface of the sheet part 110. And the reinforcing part 120 may be positioned on at least one of both ends of the reaction area 112.

In addition, as shown in FIG. 1, the cross-section of the reinforcing part 120 in the longitudinal direction may be a streamlined shape that is curved to become thinner toward both ends from the center thereof. One end part of the reinforcing part 120 in the longitudinal direction is positioned on the reaction area 112 and the other end part is positioned on the non-reaction area 111. When the cross-section of the reinforcing part 120 has an angular shape, voids and bubbles may be generated between the respective components, such as the reinforcing part 120 and the electrode 200, the electrolyte membrane 100 and the sub-gasket 300, and thus it is preferable to have a streamlined cross-section to prevent this problem.

Meanwhile, the width of the reinforcing part 120 may be equal to or greater than the width of the reaction area 112. Preferably, the width of the reinforcing part 120 may be formed equal to the width of the sheet part 110.

Figure 5:
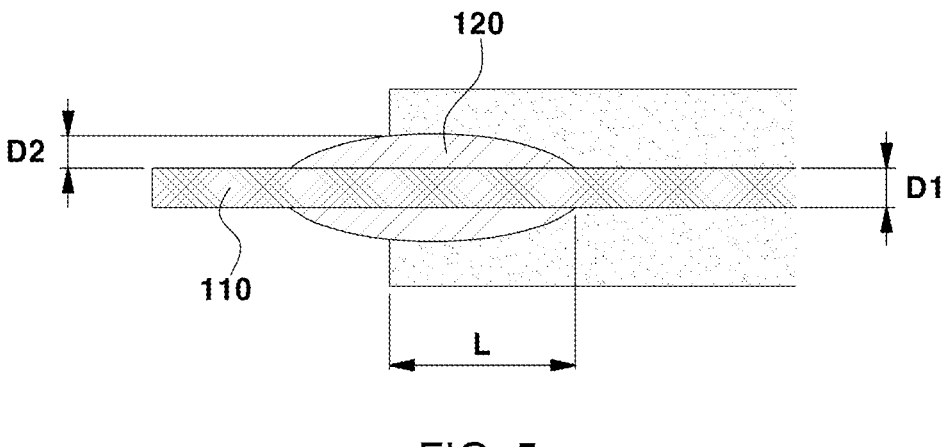
FIG. 5 shows a reference diagram for describing in more detail the specifications of the reinforcing part according to an exemplary embodiment of the present invention.

FIG. 5 shows a reference diagram for describing the specifications of the reinforcing part 120. For example, a ratio (D2/D1) of a thickness D2 of the reinforcing part 120 to a thickness D1 of the sheet part 110 may be about 0.1 to 1. The thickness D2 of the reinforcing part 120 is the thickness of the thickest part based on the cross-section in the longitudinal direction of the reinforcing part 120. In particular, the thickness D2 of the reinforcing part 120 may be about 5 µm to 50 µm. When the thickness of the reinforcing part is less than about 5 µm, it is difficult to manage, and the effect of improving durability by the reinforcing part 120 is insignificant. On the other hand, when the thickness D2 of the reinforcing part is greater than about 50 µm, production costs may increase unnecessarily.

In addition, a distance L from one end of the reaction area 112 to one end of the reinforcing unit 120 disposed on the reaction area 112 may be greater than about 2 cm. This is because the deterioration of the electrolyte membrane experimentally occurs up to 1 cm to 2 cm. The upper limit of the distance L is not particularly limited but may be about 5 cm, about 6 cm, about 7 cm, about 8 cm, or about 10 cm.

The sheet part 110 may include a first ionomer. The first ionomer is not particularly limited but may include a polymer having a hydrogen ion conductive functional group such as a sulfonic acid group and may include, for example, a perfluorinated sulfonic acid-based polymer such as Nafion.

The reinforcing part 120 may include a second ionomer. The second ionomer is not particularly limited but may include a polymer having a hydrogen ion conductive functional group such as a sulfonic acid group and may include, for example, a perfluorinated sulfonic acid-based polymer such as Nafion.

The first ionomer and the second ionomer may be the same as or different from each other, such as a type, an equivalent weight, or the like.

The sheet part 110 may not include an antioxidant or may include the antioxidant in an amount of about 1 µg/cm$^2$ or less. Meanwhile, the reinforcing part 120 may include an antioxidant in an amount of about 1 µg/cm$^2$ to 100 µg/cm$^2$. The performance of the sheet part 110 may be improved by reducing or deleting the content of the antioxidant, and durability may be further improved by concentrating the antioxidant on the reinforcing part 120, which is a weak part.

The antioxidant is not particularly limited and for example, may suitably include cerium ($Ce^{3+}$ or $Ce^{4+}$) in an ionic state and/or cerium oxide ($CeO_2$). It may be preferable to use cerium oxide in order to maintain durability characteristics. The cerium oxide may have an average diameter (D50) of about 100 nm in consideration of dispersibility.

The electrode 200 may include any type in the technical field to which the present invention pertains. For example, it may include a platinum catalyst supported on a support such as Pt/C, a platinum alloy catalyst supported on a support such as Pt-M/C, etc.

The electrode 200 may be disposed on the reaction area 112, and thus may cover a portion of the reinforcing part 120. Since the cross-section of the reinforcing part 120 is streamlined, voids, bubbles, etc., are not generated between the electrode 200 and the reinforcing part 120.

Meanwhile, the sub gasket 300 may be positioned in a space defined by the side surface of the electrode 200 and the remaining part of the reinforcing part 120 not covered by the electrode 200. Similarly, since the cross-section of the reinforcing part 120 is streamlined, voids or bubbles may not be generated between the sub-gasket 300 and the reinforcing part 120.

The electrolyte membrane for a fuel cell can be manufactured by integrating the electrolyte membrane into the above-mentioned shape using a mold or by coating the ionomer solution on the sheet part 110 to form the reinforcing part 120.

The coating method of the ionomer solution is not particularly limited, but it may be preferable to use a spray coating method to implement a streamlined cross-sectional shape of the reinforcing part 120. The sheet part 110 may be supplied in a roll-to-roll method, a region in which the reinforcing part 120 is to be formed is marked on the sheet part 110, and then an ionomer solution may be coated on the region to form the reinforcing part 120.

When forming the reinforcing part 120 by spray coating as described above, it is preferable to spray the ionomer solution in the direction of gravity. When sprayed in the opposite direction of gravity, the ionomer may be scattered, causing contamination of materials and equipment.

After the electrolyte membrane 100 is manufactured as described above, the electrode 200 may be attached to the electrolyte membrane 100 by a method such as transfer.

Thereafter, the membrane-electrode assembly can be obtained by attaching the sub gasket 300 along the edge of the electrolyte membrane 100.

As described in detail above, the scope of the present disclosure is not limited to the above description, and various modifications and improvements of those skilled in the art using the basic concept of the present disclosure defined in the following claims are also included in the scope of the present disclosure.

What is claimed is:

1. An electrolyte membrane for a fuel cell, comprising:
a sheet part having a plate shape with a predetermined length and width, wherein the sheet part comprises a non-reaction area in a peripheral portion and a reaction area in a center portion; and
a reinforcing part positioned on at least one of longitudinal ends of the reaction area and having a predetermined thickness,
wherein a cross section in the longitudinal direction of the reinforcing part has a streamline curved shape such that a thickness of the cross section is reduced toward both ends from a center portion thereof.

2. The electrolyte membrane of claim 1, wherein a thickness of the sheet part ranges from about 5 μm to 50 μm.

3. The electrolyte membrane of claim 1, wherein the reinforcing part is disposed on at least one surface of the sheet part.

4. The electrolyte membrane of claim 1, wherein one end of the reinforcing part in the longitudinal direction of the electrolyte membrane is positioned on the reaction area, and the remaining end is positioned on the non-reaction area.

5. The electrolyte membrane of claim 1, wherein the reinforcing part has an equal or greater width than the reaction area.

6. The electrolyte membrane of claim 1, wherein a ratio of a thickness of the reinforcing part to the sheet part ranges from about 0.1 to about 1.

7. The electrolyte membrane of claim 1, wherein a thickness of the reinforcing part ranges from about 5 μm to about 50 μm.

8. The electrolyte membrane of claim 1, wherein a distance from one end of the reaction area to one end of the reinforcing part disposed on the reaction area ranges from about 2 cm to about 5 cm.

9. The electrolyte membrane of claim 1, wherein the sheet part comprises an antioxidant in an amount of about 1 $μg/cm^2$ or less.

10. The electrolyte membrane of claim 1, wherein the reinforcing part comprises an antioxidant in an amount of about 1 $μg/cm^2$ to 100 $μg/cm^2$.

11. The electrolyte membrane of claim 1, wherein the sheet part comprises a first ionomer,
the reinforcing part comprises a second ionomer, and
the first ionomer and the second ionomer are the same as or different from each other.

12. A membrane-electrode assembly for a fuel cell, comprising:
the electrolyte membrane of claim 1;
a pair of electrodes disposed on the reaction area of the electrolyte membrane;
a sub-gasket disposed on the non-reaction area of the electrolyte membrane.

13. The membrane-electrode assembly of claim 12, wherein at least one electrode of the pair of electrodes covers a portion of the reinforcing part, and
the sub-gasket is positioned in a space defined by a side surface of at least one electrode of the pair of electrodes and remaining portion of the reinforcing part not covered by at least one electrode of the pair of electrodes.

14. A method of manufacturing an electrolyte membrane for a fuel cell, comprising:
preparing a sheet part having a plate shape with a predetermined length and width, wherein the sheet part comprises a non-reaction area in a periphery portion and a reaction area in a center portion; and
forming a reinforcing part having a predetermined thickness on at least one of longitudinal ends of the reaction area,
wherein a cross section in the longitudinal direction of the reinforcing part has a streamline curved shape such that a thickness of the cross section is reduced toward both ends from a center portion thereof.

15. The method of claim 14, wherein the reinforcing part is formed by spray coating an ionomer solution.

16. The method of claim 14, wherein the sheet part is supplied in a roll-to-roll manner, the sheet part is marked on a region in which the reinforcing part is to be formed, and the reinforcing part is formed in the region.

17. A fuel cell comprising the electrolyte membrane of claim 1.

18. A fuel cell comprising the electrolyte membrane manufactured by the method of claim 14.

19. A vehicle comprising the fuel cell of claim 17.

20. An electrolyte membrane for a fuel cell, comprising:

a sheet part having a plate shape with a predetermined length and width, wherein the sheet part comprises a non-reaction area in a peripheral portion and a reaction area in a center portion; and a reinforcing part positioned on at least one of longitudinal ends of the reaction area and having a predetermined thickness, wherein a distance from one end of the reaction area to one end of the reinforcing part disposed on the reaction area ranges from about 2 cm to about 5 cm.

\* \* \* \* \*